US012635601B2

(12) United States Patent
Dunbar et al.

(10) Patent No.: US 12,635,601 B2
(45) Date of Patent: May 26, 2026

(54) FLEXIBLE ROTARY MOWER DECK LIFT SYSTEM

(71) Applicant: DEERE & COMPANY, Moline, IL (US)

(72) Inventors: Robert D. Dunbar, Holly Springs, NC (US); Jeremy B. Lambert, Raleigh, NC (US); Vinesh Y. Deshmukh, Cary, NC (US)

(73) Assignee: DEERE & COMPANY, Moline, IL (US)

( * ) Notice: Subject to any disclaimer, the term of this patent is extended or adjusted under 35 U.S.C. 154(b) by 496 days.

(21) Appl. No.: 18/298,535

(22) Filed: Apr. 11, 2023

(65) Prior Publication Data

US 2024/0341223 A1     Oct. 17, 2024

(51) Int. Cl.
| | |
|---|---|
| *A01D 34/74* | (2006.01) |
| *A01D 34/00* | (2006.01) |
| *A01D 34/81* | (2006.01) |
| *A01D 101/00* | (2006.01) |

(52) U.S. Cl.
CPC ........... *A01D 34/74* (2013.01); *A01D 34/006* (2013.01); *A01D 34/81* (2013.01); *A01D 2101/00* (2013.01)

(58) Field of Classification Search
CPC ....... A01D 34/74; A01D 34/006; A01D 34/81
See application file for complete search history.

(56) References Cited

U.S. PATENT DOCUMENTS

| | | | |
|---|---|---|---|
| 3,473,302 | A | 10/1969 | Caldwell |
| 3,797,209 | A | 3/1974 | Davis |
| 3,918,240 | A * | 11/1975 | Haffner ................... F15B 11/17 56/11.9 |
| 4,497,160 | A | 2/1985 | Mullet et al. |
| 4,858,417 | A | 8/1989 | Priefert et al. |
| 5,065,568 | A | 11/1991 | Braun et al. |
| 5,177,942 | A | 1/1993 | Hager et al. |
| 5,241,808 | A | 9/1993 | Colistro |
| 5,280,695 | A | 1/1994 | Nunes, Jr. et al. |
| 5,771,669 | A | 6/1998 | Langworthy et al. |
| 6,000,202 | A | 12/1999 | Laskowski |
| 6,065,274 | A | 5/2000 | Laskowski et al. |
| 6,308,503 | B1 | 10/2001 | Scag et al. |
| 6,347,503 | B1 | 2/2002 | Esau et al. |
| 6,389,786 | B1 | 5/2002 | Bergsten et al. |
| 6,494,026 | B1 | 12/2002 | Schmidt |
| 6,530,198 | B2 | 3/2003 | Bergsten et al. |

(Continued)

FOREIGN PATENT DOCUMENTS

| | | | | |
|---|---|---|---|---|
| CA | | 1318508 C * | 6/1993 | ............. A01D 75/30 |

OTHER PUBLICATIONS

Hustler, Super 104 Operators manual, p. 1-52.

(Continued)

*Primary Examiner* — Claude J Brown

(57) ABSTRACT

A flexible rotary mower deck lift system includes a center deck having a first end and a second end, and a wing deck pivotably attached to each of the first and second ends. A linear actuator may be actuated to raise and hold each wing deck at a position that is parallel to the center deck, and a lift cylinder may be actuated to raise the center deck and the wing decks together to an intermediate position above a ground surface wherein the center deck and the wing decks are out of contact with the ground surface.

15 Claims, 4 Drawing Sheets

(56) References Cited

U.S. PATENT DOCUMENTS

| | | |
|---|---|---|
| 6,591,593 B1 | 7/2003 | Brandon et al. |
| 6,684,615 B1 | 2/2004 | Bland et al. |
| 6,796,112 B1 | 9/2004 | Price |
| 7,089,722 B2 | 8/2006 | Laskowski |
| 7,111,443 B2 | 9/2006 | Anderson et al. |
| 7,313,902 B1 | 1/2008 | Eavenson, Sr. et al. |
| 7,401,456 B2 | 7/2008 | Korthals |
| 7,434,379 B2 | 10/2008 | Nogami et al. |
| 7,640,719 B2 | 1/2010 | Boyko |
| 7,712,294 B2 | 5/2010 | Wright et al. |
| 7,841,157 B2 | 11/2010 | Latuszek et al. |
| 8,042,322 B1 | 10/2011 | Wyatt |
| 8,490,374 B2 | 7/2013 | Latuszek et al. |
| 8,544,246 B2 | 10/2013 | Jackson et al. |
| 8,965,630 B2 | 2/2015 | Wyatt et al. |
| 9,173,346 B2 | 11/2015 | Koike et al. |
| 9,179,596 B2 | 11/2015 | Phillips et al. |
| 10,334,780 B2 | 7/2019 | Bartel et al. |
| 10,543,743 B1 | 1/2020 | Keller |
| 10,631,459 B2 | 4/2020 | Mullet et al. |
| 2004/0148917 A1 | 8/2004 | Eastwood |
| 2007/0119139 A1 | 5/2007 | Hofmann et al. |
| 2018/0014460 A1 | 1/2018 | Mullet et al. |
| 2019/0150359 A1 | 5/2019 | Gust et al. |
| 2019/0254228 A1 | 8/2019 | Tate et al. |

OTHER PUBLICATIONS

Lastec, WZ400 Gas series 3873C Owner's Manual, p. 1-70.
Lastec, WZ600 series D3780 Owner's Manual, p. 1-76.
Lastec, WZ800 series D3700 Owner's Manual, p. 1-75.
Z Master, Professional 7500-D Series Riding Mower Operators manual, p. 1-72.
Lastec, WZ600 Commercial Zero Turn Mower, p. 1-5, [retrieved on Sep. 16, 2020]. Retrieved from the Internet: <URL: https://www.lastec.com/wz600-commercial-zero-turn-mower>.
Lastec, WZ800 Commercial Zero Turn Mower, p. 1-8, [retrieved on Sep. 16, 2020]. Retrieved from the Internet: <URL: https://www.lastec.com/wz800-commercial-zero-turn-mower>.
Lastec, WZ1000 Commercial Zero Turn Mower, p. 1-7, [retrieved on Sep. 16, 2020]. Retrieved from the Internet: <URL: https://www.lastec.com/wz1000-commercial-zero-turn-mower>.

* cited by examiner

FLEXIBLE ROTARY MOWER DECK LIFT SYSTEM

FIELD OF THE INVENTION

This invention relates generally to rotary mower decks for cutting grass, and specifically to a lift system for flexible rotary mower decks.

BACKGROUND OF THE INVENTION

Flexible rotary mower decks for cutting grass may be as wide as 100 inches or more. Most large flexible mower decks include wing sections connected to the left and right sides of a center deck. The center deck and each wing section may cover one or more rotary cutting blades, which may be rotated by a belt and pulley system connected to the center deck, or by electric or hydraulic motors on each wing section. Hinges allow each wing section to flex up or down relative to the center deck when mowing uneven ground, or to raise the wing sections to transport or stowed positions. In the transport or stowed positions, the wing sections may be vertical to reduce the width of the deck.

Flexible rotary mower decks may be used on zero turning radius (ZTR) or stand on mowers. These mowers have at least one independently powered rear drive wheel on each side of a frame. The independent rear drive wheels allow the mowers to turn on a vertical turning axis centrally located between the pair of rear drive wheels. The operator may use left and right control levers or other steering controls to turn around quickly using the pair of rear drive wheels, then continue mowing at ground speeds as fast as 7 mph-8 mph or more. Flexible rotary mower decks also may be used on other mowing vehicles such as lawn tractors.

For example, at the end of each pass, the operator may turn around a ZTR or stand on mower to make the next pass. Alternating passes may be used for striping or cross cutting. With smaller rigid floating decks, the operator may raise the mower deck when making each 180 degree turn, then quickly lower the mower deck back to the same cutting height for the next pass. Raising the mower deck may reduce the chance of turf damage during 180 degree turns, by eliminating contact between the deck and the ground. Raising the mower deck also may reduce the drag force caused by the deck's contact with the ground, further reducing the chance of turf damage from the drive tires when turning around.

Conventional lift systems for large flexible rotary mower decks include lift cylinders to raise the floating center deck, and lift cylinders to fold the flexible wing sections up vertically. In some cases, belts also may be disengaged when the wing sections are folded up. However, lift systems for flexible rotary mower decks cannot raise or lower the center deck and wing decks quickly when turning around for striping or cross cutting. A lift system is needed to quickly raise and lower a large flexible mower deck when turning around after each pass for striping or cross cutting. A system is needed to prevent turf damage when turning around large flexible rotary mower decks.

SUMMARY OF THE INVENTION

A flexible rotary mower deck lift system for a center deck with a left wing deck and a right wing deck pivotably attached thereto. An actuator such as an electric linear actuator connected to each wing deck is used to pivotably raise each wing deck to a position parallel or at a small angle relative to the center deck. A lift cylinder is used to raise the center deck and the pivotably raised wing decks together to an intermediate position above a mowing position when turning around and then return the center deck and the wing decks to the mowing position.

DESCRIPTION OF THE PREFERRED EMBODIMENT

Figure 1:
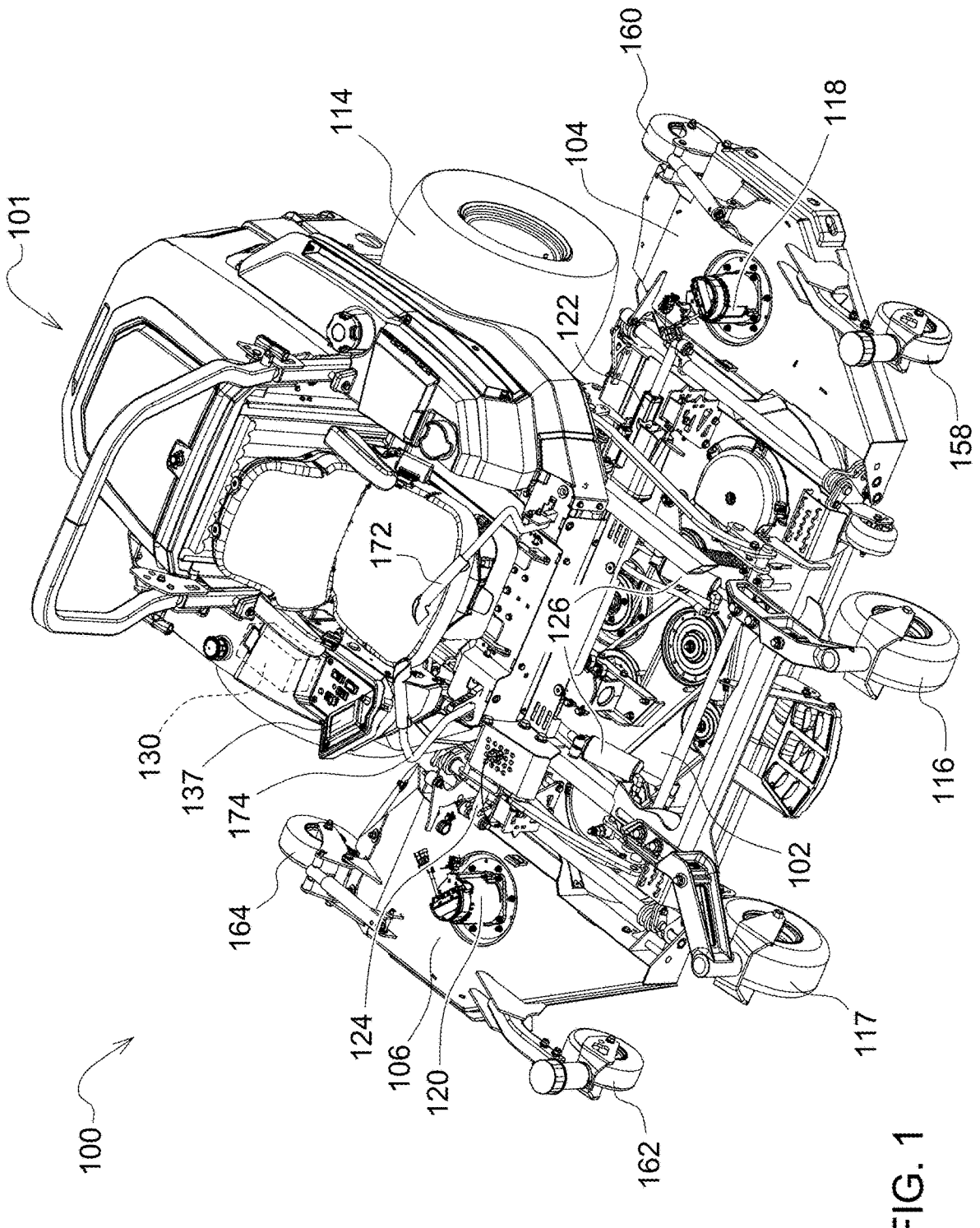
FIG. 1 is a perspective view of a zero turning radius mower with a flexible rotary mower deck lift system according to a first embodiment of the invention.

In one embodiment shown in FIG. 1, flexible rotary mower deck lift system 100 may be on a zero turning radius ("ZTR") mower 101 or other vehicle such as a stand on mower or lawn tractor. The ZTR mower may include a pair of independent rear drive wheels 114, 115 driven by an internal combustion engine, battery pack or other power source. Alternatively, electric motors may rotate each of the independent rear drive wheels. The independent rear drive wheels allow the ZTR mower to turn quickly on a vertical turning axis centrally located between the pair of wheels. A seated operator may use left and right steering control levers 172, 174, joysticks, a steering wheel or other steering controls to control the pair of independent rear drive wheels and mow at ground speeds as fast as 7 mph-8 mph or more. By sharply turning the ZTR mower around, alternating passes may be used for striping or cross cutting. The ZTR mower also may include display panel 137 adjacent the steering controls which may display or notify the operator about the deck position when turning.

Figure 2:
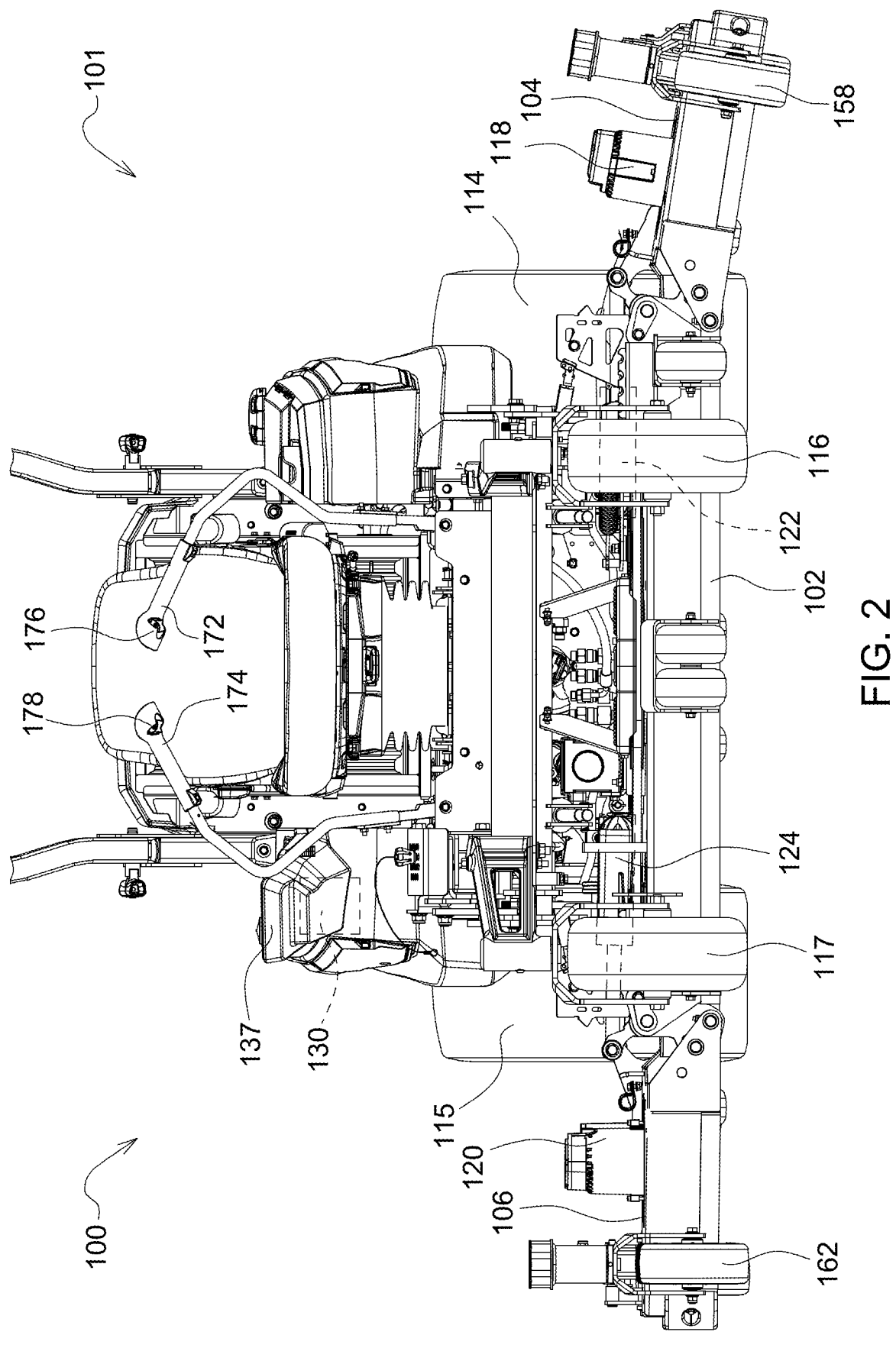
FIG. 2 is a front view of a zero turning radius mower with a flexible rotary mower deck lift system before pivoting the left wing deck to an intermediate position that is parallel to the center deck according to a first embodiment of the invention.

In one embodiment, flexible rotary mower deck lift system 100 may be used with a flexible rotary mower deck having a center deck 102 and left and right wing decks 104, 106. The flexible rotary mower deck may have a total deck width of 100 inches or more. The wing decks may be pivotably mounted to the left and right ends of the center deck and may flex to follow changes in the ground surface. The center deck may be suspended from the frame, also referred to as a floating deck. Center deck 102 may include caster wheels 116, 117. Hinge mechanisms may allow each wing deck to pivot upward and downward relative to the center deck while mowing. For example, FIG. 2 shows left wing deck 104 pivoted downward relative to center deck 102.

In one embodiment, flexible rotary mower deck lift system 100 may include left wing deck 104 supported by front caster wheel 158 and rear trailing wheel 160, and right wing deck 106 supported by front caster wheel 162 and rear trailing wheel 164. Left wing deck 104 may have electric motor 118 to rotate one or more rotary mower blades, and right wing deck 106 may have electric motor 120 to rotate one or more rotary mower blades. For example, each wing deck may have a 4 KW to 8 KW electric motor. Alternatively, each wing deck may have a hydraulic motor to rotate the blades.

Figure 3:
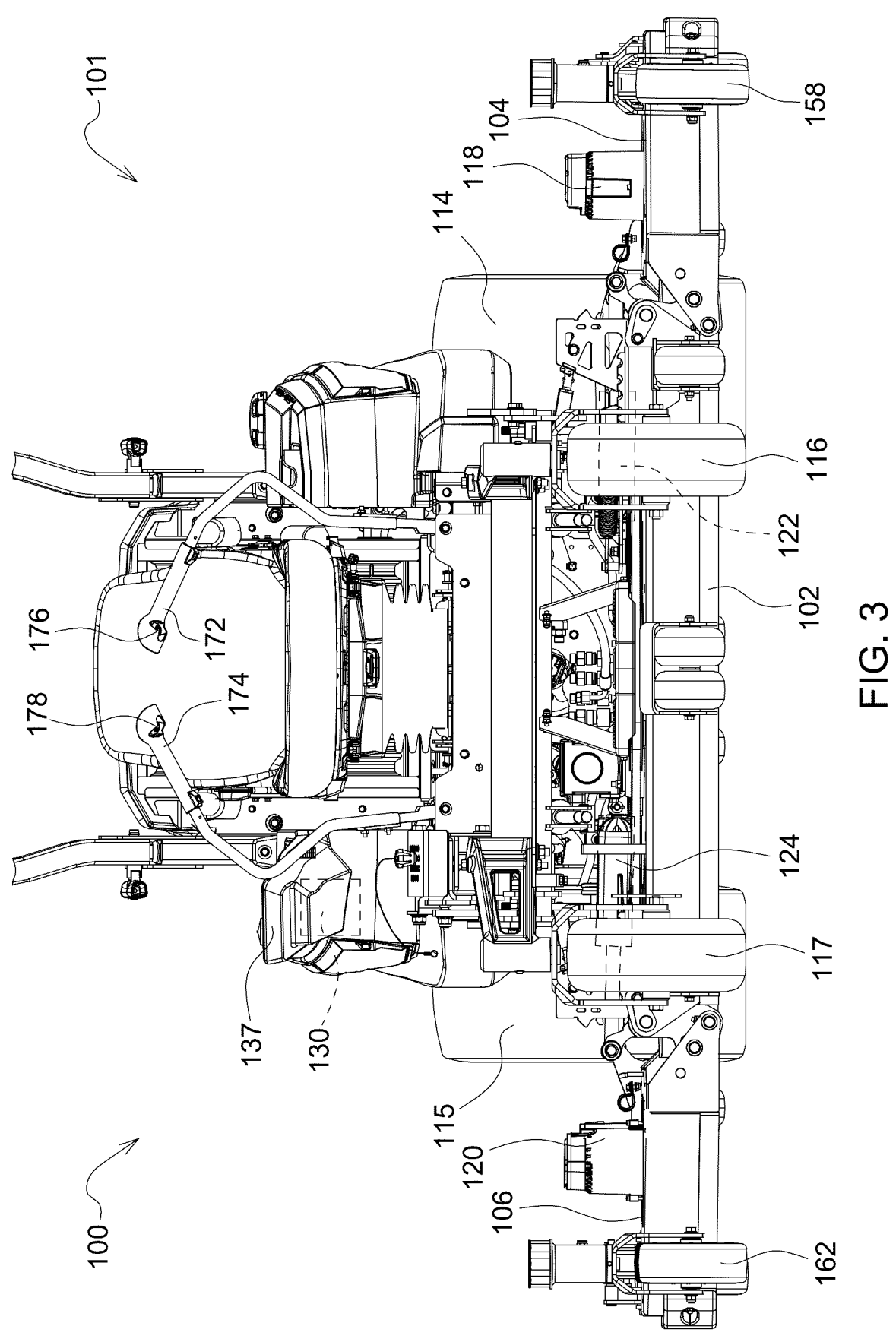
FIG. 3 is a front view of a zero turning radius mower with a flexible rotary mower deck lift system wherein both wing decks are pivoted to a position that is parallel to the center deck according to a first embodiment of the invention.

In one embodiment, flexible rotary mower deck lift system 100 may include independently controlled wing deck actuators 122, 124 that can pivotally raise wing decks 104, 106 up to a position that is parallel with center deck 102. It will be understood that each wing deck is considered parallel to the center deck even at a relatively small angle such as 15 degrees from the center deck, provided that the wing deck can be pivotally raised quickly to that position. For example, each wing deck actuator 122, 124 may be connected between a wing deck and the center deck, and may be controlled by electrical signals from vehicle control unit 130. The wing deck actuators are preferably electric linear actuators, but other actuators such as hydraulic actuators or rotary electric actuators may be used. The wing deck actuators may use position sensing so the vehicle controller can determine where the actuator is on it total travel or stroke. Position sensing of the wing deck actuators allows the vehicle control unit to control the actuators to pivotally raise the wing decks from a non-parallel position to a parallel position. For example, FIG. 2 shows left wing deck 104 in a non-parallel position, flexing downwardly relative to center deck 102. FIG. 3 shows left wing deck 104 pivotally raised to a parallel position relative to center deck 102, creating a large rigid section. Right wing deck 106 is parallel to the center deck in FIGS. 2 and 3. The vehicle control unit may provide electrical signals for each wing deck actuator to hold up the wing decks to remain parallel to the center deck for a specified duration or preset time, preventing the wing decks from flexing down relative to the center deck. The actuators may pivotally raise the wing decks without changing the position or operation of any belt or motor.

Figure 4:
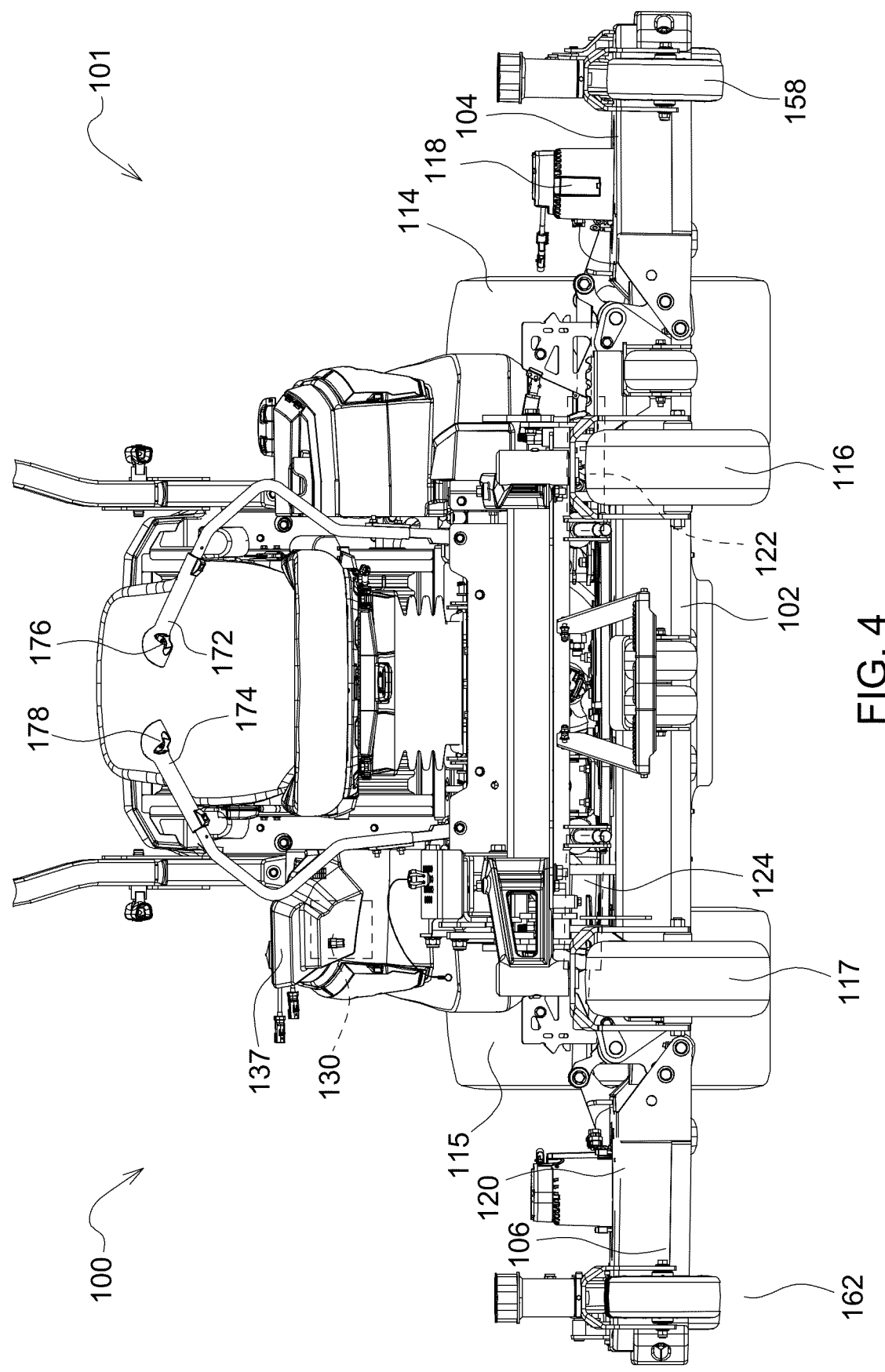
FIG. 4 is a front view of a zero turning radius mower with a flexible rotary mower deck lift system wherein both wing decks are pivoted to a position that is parallel to the center deck and the complete deck is raised to an intermediate or cross cut position.

In one embodiment, flexible rotary mower deck lift system 100 may include one or more lift cylinders 126 between the mowing vehicle frame and center deck 102. Lift cylinders 126 may be electrically controlled by signals from vehicle control unit 130 and may be hydraulic or electric linear actuators. After the wing deck actuators 122, 124 pivotally raise the wing decks to be parallel to the center deck, lift cylinders 126 may raise the center deck and wing decks together to the intermediate or cross cut position, and hold the deck components in this position during a turn. The intermediate or cross cut position may be about 3 to 6 inches above the mowing position, but not as high as the storage or transport position. In the intermediate or cross cut position, the rotary blades may continue to be engaged and rotate. As shown in FIG. 4, in the intermediate or cross cut position, the center deck, wing decks and other deck components including front caster wheels 158, 162 and rear trailing wheels 160, 164 are raised sufficiently so they do not contact the ground The system allows the operator to raise the deck to make a 180 degree turn and then quickly lower the deck back to the mowing position. For example, the system may require only one command from the operator to the vehicle control unit, to provide signals that first raise and then lower the deck. When the flexible rotary mower deck lift system raises the deck to the intermediate or cross cut position, there is less chance of turf damage when turning around, because contact between the deck and ground is eliminated. In the intermediate or cross cut position, there also is a reduction in drag force caused by the deck's contact with the ground, and a reduction in the chance of turf damage from the drive tires during 180 degree turns.

In one embodiment, flexible rotary mower deck lift system 100 may include operator controls 176, 178 such as toggle switches or buttons connected to vehicle control unit 130. For example, one or more toggle switches or buttons 176, 178 may be on steering control levers 172, 174 or display panel 137. The operator controls may be used to command vehicle control unit 130 to provide electrical signals that pivotally raise the wing decks up to positions that are parallel with the center deck and then raise the complete deck to the intermediate or cross cut position. A preferred embodiment includes vehicle control unit 130, but other embodiments may include electrical components to pivotally raise the wing decks and entire deck to the intermediate or cross cut position. The same operator controls may be used to command the vehicle control unit to release or lower the wing decks from their position parallel to the center deck, and return the deck components from the intermediate position back to the mowing position. The system may allow the operator to make a turn and then quickly lower the deck back to the mowing position. Alternatively, the operator controls may provide a single command to the vehicle control unit to raise and lower the deck within a preset time to turn around the mower. For example, the operator controls may command the vehicle control unit to provide electrical signals to pivotally raise the wing decks, then raise the center deck and wing decks together to the intermediate or cross cut position, and then lower the center deck and release the wing decks, during a preset time. Alternatively, the operator controls may include a momentary switch to pivotally raise the wing decks, and raise the center deck and wing decks to the intermediate or cross cut position while turning around. Alternatively, the vehicle control unit may provide electrical signals to lower the wing decks and center deck to the mowing position when a signal to the vehicle control unit indicates a turn is completed because both steering controls are in the forward traction drive position. In still another alternative embodiment, the vehicle control unit also may provide electrical signals to pivotally raise the wing decks, and then raise the entire deck, each time the vehicle control unit detects the steering controls are positioned to turn the mowing vehicle around, or detects the mowing vehicle is entering a turn.

Having described the preferred embodiments, it will become apparent that various modifications can be made without departing from the scope of the invention as defined in the accompanying claims.

The invention claimed is:

1. A flexible rotary mower deck lift system, comprising:
a center deck with a left wing deck and a right wing deck pivotably attached thereto;
an actuator connected between the center deck and each wing deck to pivotably raise each wing deck to a position less than or equal to 15 degrees from the angle of the center deck; and
a lift cylinder to move the center deck and the pivotably raised wing decks together to an intermediate position above a mowing position and in which the center deck and pair of wing decks are out of contact with a ground surface and to a transport position above the intermediate position.

2. The flexible rotary mower deck left system of claim 1 further comprising an operator control on a steering control lever that provides a single command to pivotably raise the wing decks and raise the center deck and the pivotably raised wing decks together to the intermediate position.

3. The flexible rotary mower deck lift system of claim 2 wherein the single command also lowers the center deck and the wing decks back to the mowing position and releases the wing decks from their position parallel to the center deck.

4. The flexible mower deck of claim 1 wherein the actuators hold the wing decks parallel to the center deck while the center deck is raised to the intermediate position.

5. The flexible rotary mower deck lift system of claim 1 further comprising a vehicle control unit.

6. The flexible rotary mower deck lift system of claim 5 wherein the vehicle control unit is configured to:

receive an operator input to raise the center and wing decks to the intermediate position;

determine a position of the actuators based on signals from at least one position sensor;

command one or more of the actuators to raise the wing decks to a position less than or equal to 15 degrees from the angle of the center deck; and command said lift cylinder to raise the center deck and the pivotably raised wing decks together to the intermediate position.

7. The flexible rotary mower deck lift system of claim 6, wherein in the intermediate position one or more blades continue to be engaged and rotate.

8. A flexible rotary mower deck lift system, comprising:

a pair of actuators between a center deck and a pair of wing decks pivotably connected to the center deck;

at least one lift cylinder connected between a mowing vehicle and the center deck;

at least one position sensor configured to sense the position of said pair of actuators; and a vehicle control unit signaling the pair of actuators to pivotably raise each of the pair of wing decks to a position less than or equal to 15 degrees from the angle of the center deck, and signaling the at least one lift cylinder to raise the center deck and wing decks together to an intermediate position in which the center deck and pair of wing decks are out of contact with a ground surface and above a mowing position.

9. The flexible rotary mower deck lift system of claim 8 further comprising an operator control to command the vehicle control unit to signal the pair of actuators to pivotably raise the pair of wing decks and the at least one lift cylinder to raise the center deck and wing decks together to the intermediate position.

10. The flexible rotary mower deck lift system of claim 9 wherein the operator control is on a steering control lever.

11. The flexible rotary mower deck lift system of claim 8 wherein the vehicle control unit lowers the center deck and wing sections together to the mowing position after a preset time.

12. A flexible rotary mower deck lift system, comprising:

a center deck having a first end and a second end;

a wing deck pivotably attached to each of the first and second ends; and a linear actuator that may be actuated to raise and hold each wing deck at a position that is less than or equal to 15 degrees from the angle of the center deck;

a lift cylinder that may be actuated to raise the center deck and the wing decks together to an intermediate position above a ground surface wherein the center deck and the wing decks are out of contact with the ground surface, said intermediate position between a mowing position and a transport position; and an operator control that provides a single command to signal each linear actuator to pivotably raise and hold one of the wing decks and the lift cylinder to raise the center deck and the wing decks together to the intermediate position.

13. The flexible rotary mower deck lift system of claim 12 further comprising a front caster wheel and a rear trailing wheel on each wing deck, the front caster wheel and the rear trailing wheel being out of contact with the ground surface when the center deck and the wing decks are in the intermediate position.

14. The flexible rotary mower deck lift system of claim 12 further comprising a vehicle control unit.

15. The flexible rotary mower deck lift system of claim 12 further comprising a vehicle control unit connected to an operator control that commands the vehicle control unit to signal the linear actuators to pivotably raise the wing decks and then to signal the lift cylinder to raise the center deck and wing sections together to the intermediate position.

* * * * *